(12) United States Patent
Hed (10) Patent No.: US 7,673,946 B1
(45) Date of Patent: Mar. 9, 2010

(54) HUB APPARATUS FOR BICYCLE WHEEL AND METHOD

(75) Inventor: Steven Arthur Hed, North Oaks, MN (US)

(73) Assignee: Hed Cycling Products, Inc., Shoreview, MN (US)

( * ) Notice: Subject to any disclaimer, the term of this patent is extended or adjusted under 35 U.S.C. 154(b) by 118 days.

(21) Appl. No.: 11/859,337

(22) Filed: Sep. 21, 2007

Related U.S. Application Data

(60) Provisional application No. 60/846,172, filed on Sep. 21, 2006.

(51) Int. Cl.
*B60B 27/00* (2006.01)

(52) U.S. Cl. ........................ 301/110.6; 301/59; 301/74; 301/110.5; D12/207

(58) Field of Classification Search .................... 301/55, 301/59, 110.5, 110.6
See application file for complete search history.

(56) References Cited

U.S. PATENT DOCUMENTS

| | | | | | |
|---|---|---|---|---|---|
| 243,569 | A | * | 6/1881 | Jefferson | 301/55 |
| 348,605 | A | * | 9/1886 | Wilson | 301/59 |
| 394,718 | A | * | 12/1888 | Olsen | 301/78 |
| 491,662 | A | * | 2/1893 | McKnight | 301/84 |
| 609,258 | A | * | 8/1898 | Arnold | 301/66 |
| 680,633 | A | * | 8/1901 | Arnold | 301/35.55 |
| 712,484 | A | * | 11/1902 | Bettendorf | 301/84 |
| 779,877 | A | * | 1/1905 | Schofield | 152/46 |
| 822,151 | A | * | 5/1906 | Pease et al. | 301/78 |
| 1,159,555 | A | * | 11/1915 | Venske | 301/62 |
| 1,510,278 | A | * | 9/1924 | Hovey | 301/85 |
| D103,687 | S | | 3/1937 | Pattison | |
| D103,728 | S | | 3/1937 | Le Jeune | |
| D216,588 | S | | 2/1970 | Cannon | |
| D217,144 | S | | 4/1970 | Foster | |
| D259,346 | S | | 5/1981 | DeHaven | |
| D330,883 | S | * | 11/1992 | Harr | D12/207 |
| D350,922 | S | * | 9/1994 | Inatani | D12/207 |
| 5,795,036 | A | * | 8/1998 | Campagnolo | 301/59 |
| 6,783,192 | B2 | * | 8/2004 | Meggiolan | 301/110.5 |
| 7,066,556 | B2 | * | 6/2006 | Irie | 301/6.9 |
| D553,064 | S | | 10/2007 | Celik | |
| 2002/0000749 | A1 | | 1/2002 | Lund | |
| 2006/0043786 | A1 | | 3/2006 | Lin | |
| 2006/0145530 | A1 | * | 7/2006 | Damon | 301/110.5 |
| 2006/0208561 | A1 | | 9/2006 | Fukui | |
| 2006/0255654 | A1 | | 11/2006 | Meggiolan | |
| 2007/0132306 | A1 | | 6/2007 | Chang | |

* cited by examiner

*Primary Examiner*—Russell D Stormer
(74) *Attorney, Agent, or Firm*—Dorsey & Whitney LLP (57) ABSTRACT

A hub apparatus for a bicycle wheel with improved aerodynamic mechanism is provided. In one embodiment, the apparatus includes a hub body having a parabolic shape. The hub body is disclosed approximately about a center plane of the bicycle wheel and has a plurality of retaining holes for retaining one end of bicycle spokes.

6 Claims, 7 Drawing Sheets

HUB APPARATUS FOR BICYCLE WHEEL AND METHOD

CROSS-REFERENCE TO RELATED APPLICATION(S)

The present utility patent application claims priority of U.S. Provisional Patent Application Ser. No. 60/846,172, filed Sep. 21, 2006; subject matter of which is incorporated herewith by reference.

FIELD OF THE INVENTION

The present invention relates generally to a hub apparatus for bicycle wheels and methods thereof. More particularly, the present invention relates to a hub apparatus with improved aerodynamic mechanism.

BACKGROUND OF THE INVENTION

Improving aerodynamics of a bicycle is paramount to cycling sports. Bicycle wheel and hub systems have been designed and redesigned over the years to meet aerodynamic demand, along with many other parts of a bicycle, such as fork, crank systems, headsets, aero bars, etc. Also, the other features, such as light weight, minimum mechanical parts, etc., are also desirable to a person skilled in the art.

SUMMARY OF THE INVENTION

The present invention provides a bicycle wheel and hub system with improved aerodynamic mechanism. In addition, the present invention provides a cylinder-less hub apparatus which further improves aerodynamics of a bicycle wheel.

In one embodiment of the present invention, a hub apparatus for a bicycle wheel comprises a hub assembly having an axle member extending along a center rotating axis of the bicycle wheel; a hub body disposed along a plane of the bicycle wheel wherein the axle member extends through and is mounted on a center of the hub body, and the hub body has an aerodynamic shape.

Additionally in one embodiment, the hub apparatus is a cylinder-less apparatus which further enhances aerodynamics of the bicycle wheel.

Further in one embodiment, the hub body has a compact, parabolic shape such that when the bicycle wheel is rotating and/or moving forward, less resistance is confronted. The hub body can be made by mounting two Frisbee® disc-shaped disc halves together. Alternatively, the hub body can be made by one molded piece.

Still in one embodiment, in a case of the bicycle wheel being a back wheel, a cassette may be mounted on the axle member and secured between the axle member and the center of the hub body by securing means, such as gluing, molding, etc.

Alternatively in one embodiment, a cylinder can be mounted between the axle member and the center of the hub body if one chooses to use a conventional cylinder type of hub apparatus.

In addition, in one embodiment of the present invention, a bicycle wheel comprises a wheel rim, a hub apparatus disposed at a center of the bicycle wheel, and a plurality of spokes mounted between the wheel rim and the hub apparatus, wherein the hub apparatus includes a hub assembly having an axle member extending along a center rotating axis of the bicycle wheel; a hub body disposed along a plane of the bicycle wheel wherein the axle member extends through and is mounted on a center of the hub body, and the hub body has an aerodynamic shape.

Additionally in one embodiment, the hub apparatus is a cylinder-less apparatus which further enhances aerodynamics of the bicycle wheel.

Further in one embodiment, the hub body has a compact, parabolic shape such that when the bicycle wheel is rotating and/or moving forward, less resistance is confronted. The hub body can be made by mounting two Frisbee® disc-shaped disc halves together. Alternatively, the hub body can be made by one molded piece. Furthermore, a peripheral edge of the hub body can vary without departing from the spirit and scope of the present invention. For example, the peripheral edge of the parabolic hub body may have a blunt peripheral edge, a rounded peripheral edge, or a sharp peripheral edge, etc. Moreover, the shape of the hub body can vary without departing from the spirit and scope of the present invention. It is appreciated that the shape and form of the hub body are configured and arranged to improve aerodynamic of a forward moving bicycle wheel in consideration of wind yaw and/or the other wind factors or characteristics.

Alternatively in one embodiment, a cylinder can be mounted between the axle member and the center of the hub body if one chooses to use a conventional cylinder type of hub apparatus.

Still in one embodiment, in a case of the bicycle wheel being a back wheel, a cassette may be mounted on the axle member and secured between the axle member and the center of the hub body by securing means, such as gluing, molding, etc.

Additionally in one embodiment of the present invention, the hub body includes a plurality of holes for retaining one end of the spokes, whereby a conventional cylinder for retaining the spokes is eliminated and replaced by the aerodynamically shaped hub body. As the hub body is disposed approximately on the center of the bicycle wheel, the spokes are mounted much closer towards the center of the bicycle wheel, thereby providing further aerodynamic characteristics.

Still in one embodiment of the present invention, the retaining holes on the hub body and the corresponding ends of the spokes can be configured and arranged in a variety of shapes or forms. The other end of the spokes are retained in the wheel rim. In addition, the spokes mounted between the wheel rim and the hub body can be assembled in a radial form on both sides of the hub body in the case of a front wheel or a back wheel of a bicycle. In another embodiment, the spokes mounted between the wheel rim and the hub body can be assembled in a cross form on both sides of the hub body in the case of a back wheel. Yet in another embodiment, the spokes mounted between the wheel rim and the hub body can be mounted in a cross form on one side and a radial form on the other side of the hub body in the case of a back wheel. The spokes mounted in a cross form generate torque so as to move the back wheel forward.

These and other advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION OF THE PREFERRED EMBODIMENTS

In FIGS. 1-6, a bicycle wheel 100 includes a wheel rim 102, a hub apparatus 104 disposed at a center of the bicycle wheel 100, and a plurality of spokes 106 mounted between the wheel rim 102 and the hub apparatus 104.

The hub apparatus 104 includes a hub assembly 108 having an axle member 111 whose longitudinal axis A'-A' 112 (see FIG. 5) is normal to a center plane B'-B' 114 (see FIG. 5) of the bicycle wheel 100, a hub body 116 disposed approximately about the center plane 114 of the bicycle wheel 100. The hub body 116 has an aerodynamic shape, for example, a compact, parabolic shape, so that when the bicycle wheel 100 is rotating and/or moving forward, less resistance is confronted. The hub body 116 can be made by mounting two Frisbee® disc object halves together, e.g. a first disc side 116a, and a second disc side 116b (see FIG. 9), or one molded piece. In one embodiment, the first and second disc sides 116a, 116b are disposed face to face wherein an edge 115a of the first disc side 116a and an edge 115b of the second disc side 115b connect to each other to form an edge 115 of the hub body 116. The edge 115 of the hub body 116 cuts through air flow confronted by the bicycle wheel 100. It will be appreciated that the hub body 116 can be formed in many other suitable ways without departing from the principles of the present invention.

A peripheral edge of the hub body 116 can also vary without departing from the spirit and scope of the present invention. For example, the peripheral edge of the hub body 116 may have a blunt peripheral edge, a rounded peripheral edge, or a sharp peripheral edge, etc. Moreover, the shape of the hub body 116 can vary without departing from the spirit and scope of the present invention. It is appreciated that the shape and form of the hub body 116 are configured and arranged to improve aerodynamic of a forward moving bicycle wheel in consideration of wind yaw and/or the other wind factors or characteristics.

Figure 1:
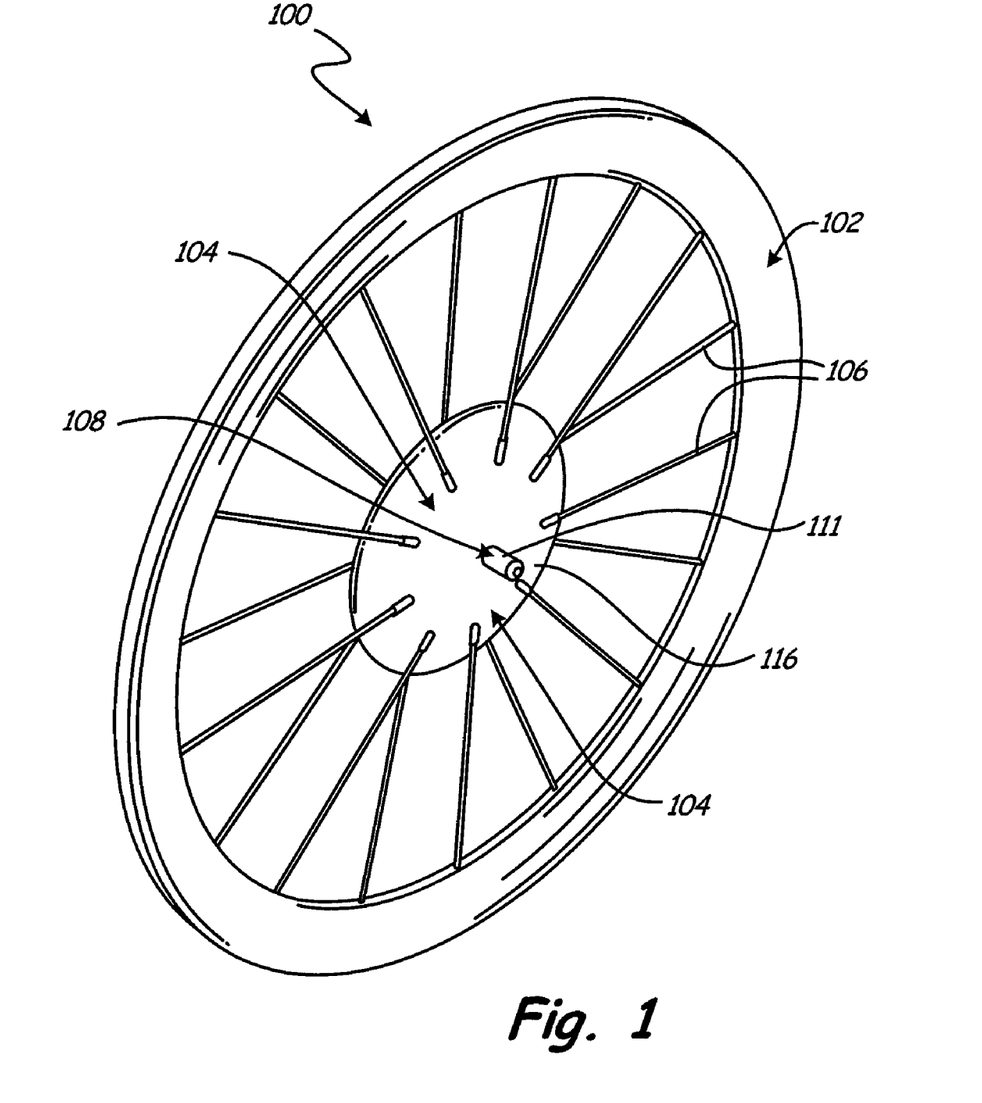
FIG. 1 illustrates a perspective view of one embodiment of a cylinder-less hub apparatus mounted in a bicycle wheel, in accordance with the principles of the present invention.
Figure 2:
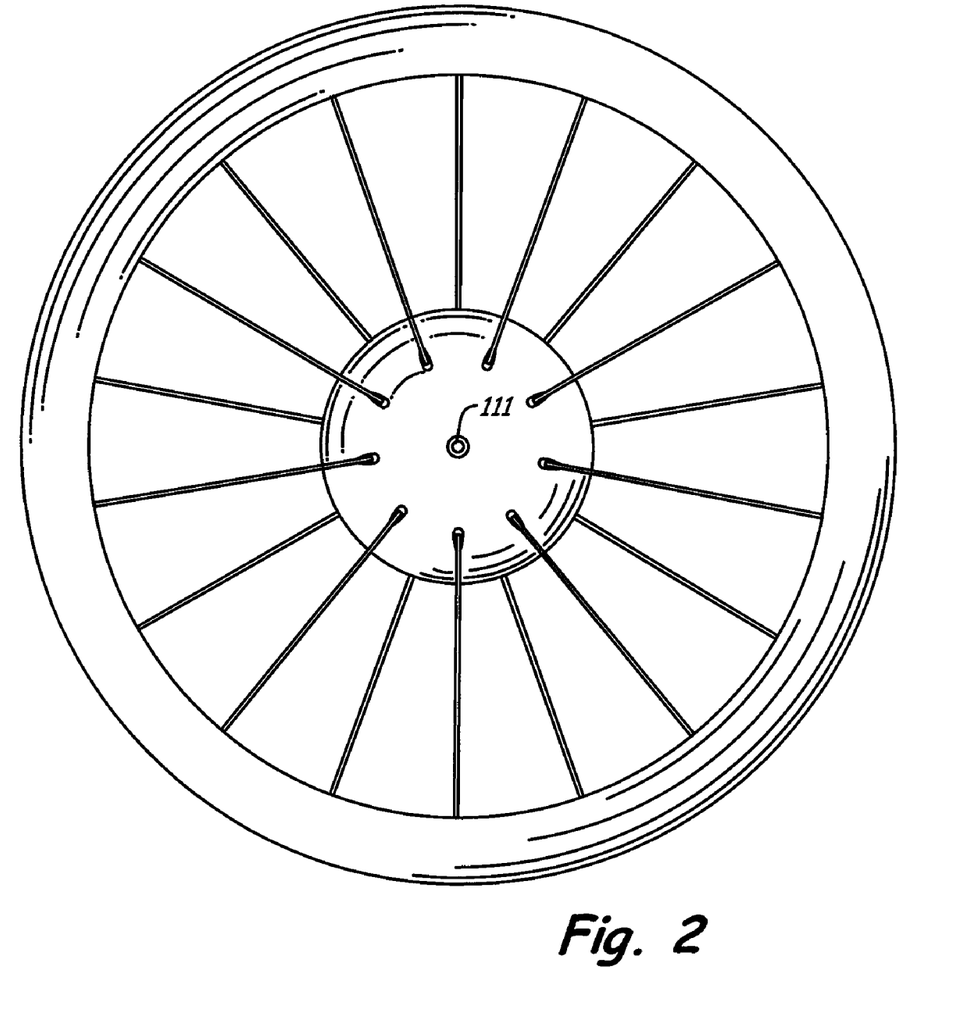
FIG. 2 illustrates a front elevational view of the cylinder-less hub apparatus mounted in the bicycle wheel having radially mounted spokes as shown in FIG. 1.
Figure 3:
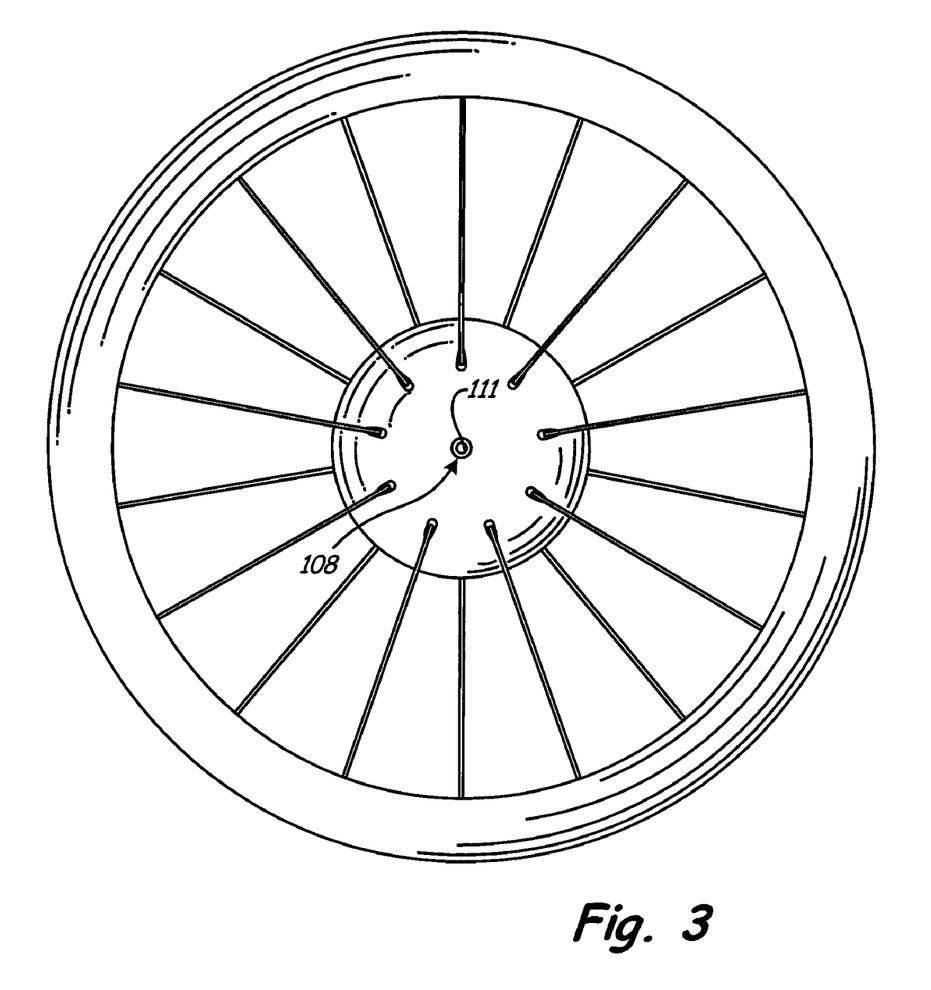
FIG. 3 illustrates a front elevational view of the cylinder-less hub apparatus mounted in another embodiment of a bicycle wheel having cross-mounted spokes.
Figure 4:
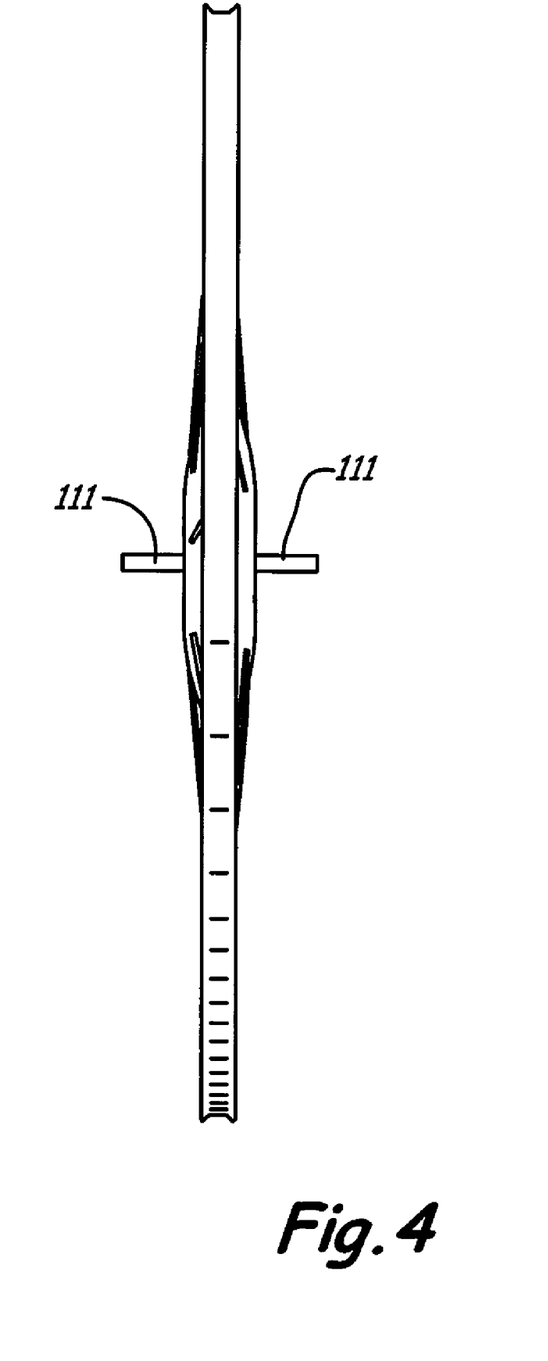
FIG. 4 illustrates a side elevational view of the cylinder-less hub apparatus mounted in the bicycle wheel as shown in FIG. 1.
Figure 5:
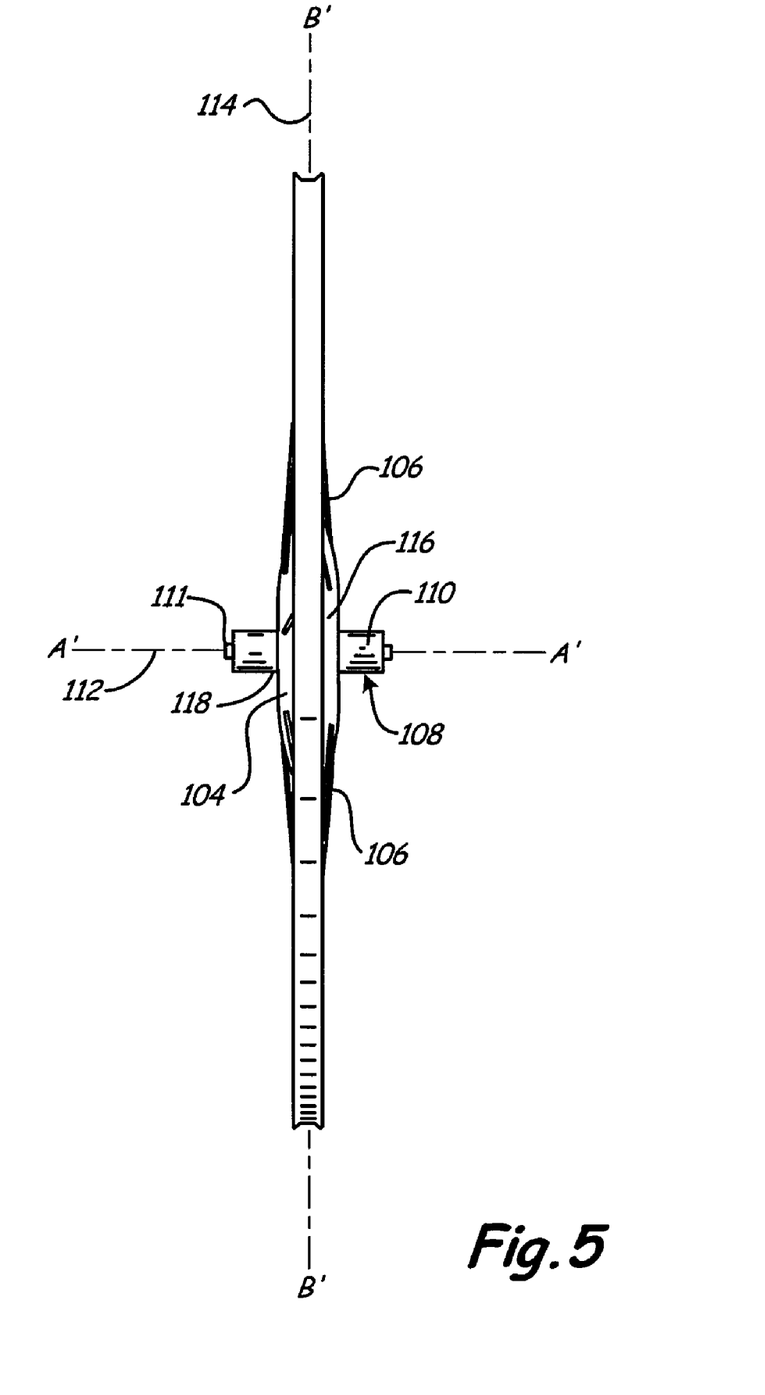
FIG. 5 illustrates a side elevational view of another embodiment of a hub apparatus having a cylinder mounted in a front bicycle wheel, in accordance with the principles of the present invention.

It is appreciated to a person skilled in the art that in an alternative embodiment as shown in FIG. 5, a hub cylinder 110 can be mounted between the axle member 111 and the center of the hub body 116 if one chooses to use a conventional cylinder type of hub apparatus 104. The conventional hub cylinder is designed to retain one end of the spokes as well as providing retaining housing for bearings. It is appreciated that in one embodiment, the bearings can be mounted between the axle member and the hub body, and the spokes can be retained on the hub body 116 (see details later), so that a conventional hub cylinder, which adds more resistance in a forward moving bicycle wheel, can be eliminated, thereby improving aerodynamics of a bicycle wheel.

Figure 6:
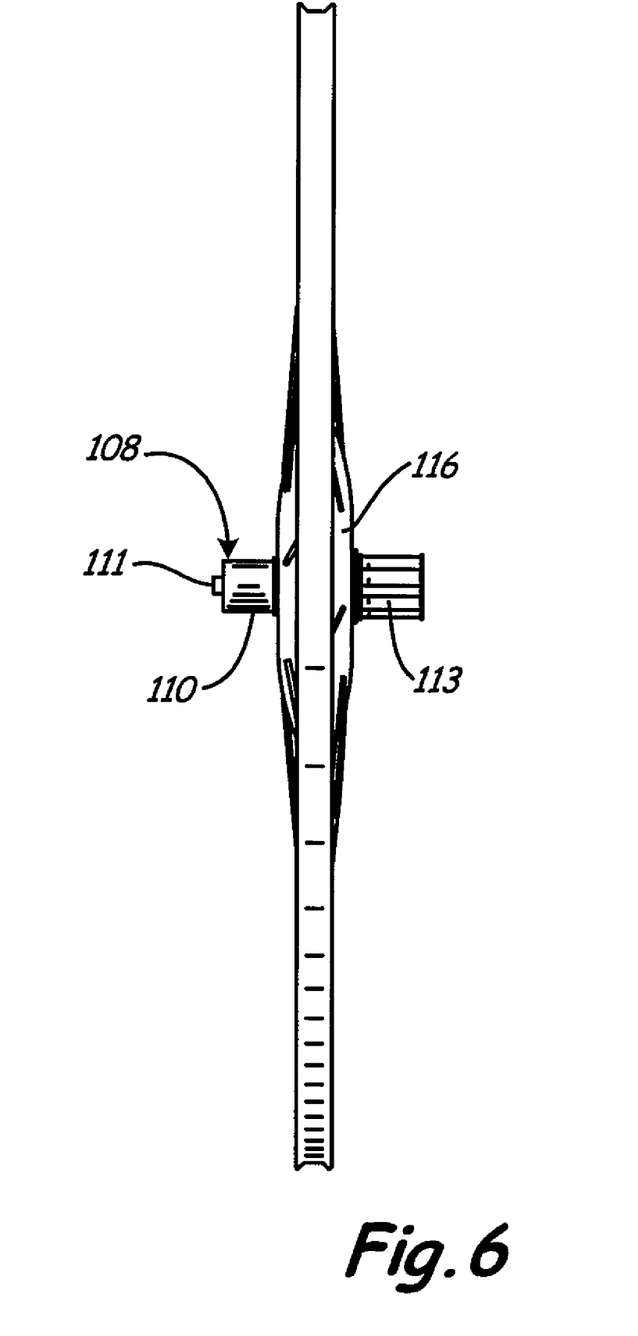
FIG. 6 illustrates a side elevational view of yet another embodiment of a hub apparatus having a cassette/cylinder mounted in a back bicycle wheel, in accordance with the principles of the present invention.

In a case of the bicycle wheel 100 being a back wheel as shown in FIG. 6, a cassette 113 may be mounted on the axle member 111 and secured between the axle member 111 and the center of the hub body 116 by securing means, such as gluing, molding, etc.

Figure 7:
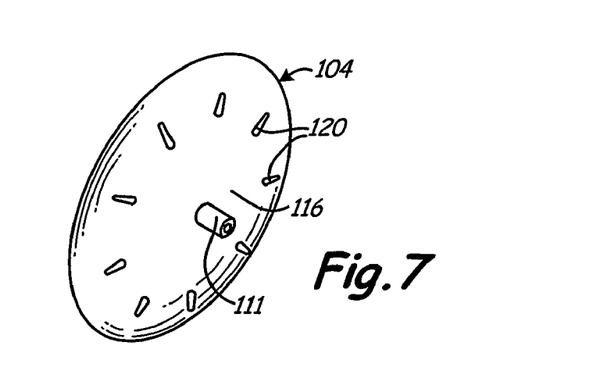
FIG. 7 illustrates a perspective view of one embodiment of a hub body shown in the cylinder-less hub apparatus in accordance with the principles of the present invention.
Figure 8:
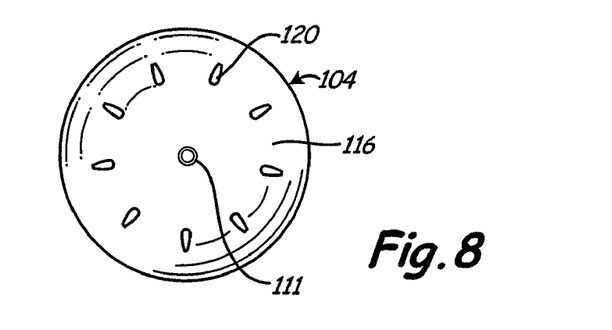
FIG. 8 illustrates a front elevational view of the hub body as shown in FIG. 7.
Figure 9:
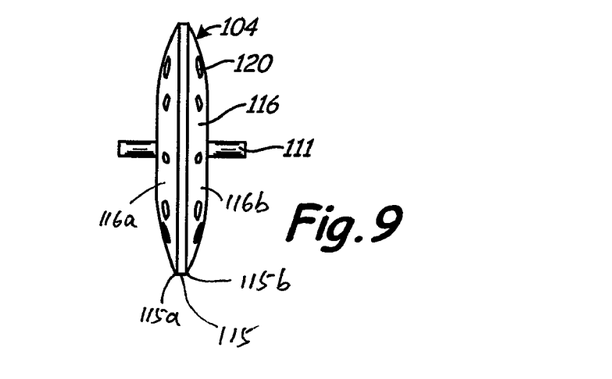
FIG. 9 illustrates a side elevational view of the hub body as shown in FIG. 7.

As shown in FIGS. 7-9, the hub body 116 includes a plurality of holes 120 for retaining one end of the spokes 106, whereby flanges or cylinder rims in conventional designs, which are typically disposed at two ends of a hub cylinder for retaining the spokes 106, are eliminated and replaced by the aerodynamically shaped hub body 116. As the hub body 116 is disposed approximately on the center plane B'-B' of the bicycle wheel 100, the spokes 106 are mounted much closer towards the center plane B'-B', thereby providing further aerodynamic characteristics.

The retaining holes 120 on the hub body 116 and the corresponding ends of the spokes 106 can be configured and arranged in a variety of shapes or forms. The other end of the spokes 106 are retained in the wheel rim 102. In addition, the spokes 106 mounted between the wheel rim 102 and the hub body 116 can be assembled in a radial form (see FIGS. 1 and 2) on both sides of the hub body 116 in the case of a front wheel or a back wheel of a bicycle. In another embodiment, the spokes 106 mounted between the wheel rim 102 and the hub body 116 can be assembled in a cross form (see FIG. 3) on both sides of the hub body 116 in the case of a back wheel.

Also, the spokes 106 mounted between the wheel rim and the hub body can be mounted in a cross form on one side and a radial form on the other side of the hub body 116 in the case of a back wheel. The spokes 106 mounted in a cross form generate torque so as to move the back wheel forward.

These and other features of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. For example, it is appreciated that the configuration and arrangement of the hub assembly, hub body, and bicycle wheel can be varied without departing from the scope of the present invention.

What is claimed is:

1. A hub apparatus for a bicycle wheel, comprising:
 a hub assembly having an axle member extending along a center rotating axis of the bicycle wheel;
 a hub body disposed about a center plane of the bicycle wheel, the hub body having a first disc side and a second disc side, the first and second disc sides being disposed face to face wherein a peripheral edge of the first disc side and a peripheral edge of the second disc side connect to each other to form a peripheral edge of the hub body, the first and second disc sides having spoke retaining points disposed between the axis and the peripheral edges of the first and second disc sides, the peripheral edge of the hub body cutting through air flow confronted by the bicycle wheel; and wherein the axle member extends through a center of the hub body.

2. The hub apparatus of claim 1, wherein the hub body has a parabolic shape.

3. A bicycle wheel, comprising:

a wheel rim;

a hub apparatus disposed at a center of the bicycle wheel; and a plurality of spokes mounted between the wheel rim and the hub apparatus;

wherein the hub apparatus comprises:

a hub assembly having an axle member extending along a center rotating axis of the bicycle wheel; and     a hub body disposed about a center plane of the bicycle wheel, the hub body having a first disc side and a second disc side, the first and second disc sides being disposed face to face wherein a peripheral edge of the first disc side and a peripheral edge of the second disc side connect to each other to form a peripheral edge of the hub body, the first and second disc sides having spoke retaining points to receive an end of a respective spoke between the axis and the peripheral edges of the first and second disc sides, the peripheral edge of the hub body cutting through air flow confronted by the bicycle wheel; and wherein the axle member extends through a center of the hub body.

4. The bicycle wheel of claim 3, wherein the hub body has a parabolic shape.

5. The bicycle wheel of claim 3, wherein the hub body comprises a plurality of holes for retaining one end of the spokes.

6. The bicycle wheel of claim 5, wherein the other end of the spokes are retained in the wheel rim.

\* \* \* \* \*